(12) United States Patent
Shirasawa et al.

(10) Patent No.: US 11,218,084 B2
(45) Date of Patent: Jan. 4, 2022

(54) POWER SUPPLY DEVICE FOR ELECTRIC VEHICLE

(71) Applicants: Kabushiki Kaisha Toshiba, Minato-ku (JP); Toshiba Infrastructure Systems & Solutions Corporation, Kawasaki (JP)

(72) Inventors: Yuki Shirasawa, Inagi (JP); Yasuomi Maki, Fuchu (JP)

(73) Assignees: Kabushiki Kaisha Toshiba, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 0 days.

(21) Appl. No.: 16/845,154

(22) Filed: Apr. 10, 2020

(65) Prior Publication Data

US 2020/0244187 A1    Jul. 30, 2020

Related U.S. Application Data

(63) Continuation of application No. PCT/JP2018/040485, filed on Oct. 31, 2018.

(30) Foreign Application Priority Data

Nov. 1, 2017 (JP) ............................. JP2017-212151

(51) Int. Cl.
*H02M 1/00* (2006.01)
*H02M 1/10* (2006.01)
(Continued)

(52) U.S. Cl.
CPC .............. *H02M 7/537* (2013.01); *B60L 5/00* (2013.01); *H02M 1/08* (2013.01);
(Continued)

(58) Field of Classification Search
None
See application file for complete search history.

(56) References Cited

U.S. PATENT DOCUMENTS 8,503,195 B1  8/2013  Mogilevski
10,615,698 B2 * 4/2020 Chang ..................... H02M 1/44
(Continued)

FOREIGN PATENT DOCUMENTS

JP    2003-047245 A    2/2003
JP    2005-151608 A    6/2005
(Continued)

OTHER PUBLICATIONS

International Search Report dated Dec. 18, 2018 in PCT/JP2018/040485 filed on Oct. 31, 2018 (with English Translation), 4 pages.
Extended European Search Report dated Jul. 2, 2021 in corresponding European Patent Application No. 18873545.0, 11 pages.

*Primary Examiner* — Kenneth B Wells
(74) *Attorney, Agent, or Firm* — Oblon, McClelland, Maier & Neustadt, L.L.P.

(57) ABSTRACT

A resonant inverter of a power supply for electric vehicle includes a first resonant capacitor and a switching element cutting off a current flowing in a resonant circuit and generates first alternating-current power from direct-current power. The transformer is included in a part of the resonant circuit, supplies the first alternating-current power generated by the resonant inverter to a first winding, and supplies second alternating-current power after conversion of the first alternating-current power to a load from a second winding. A control unit confines a difference between a resonant frequency of the resonant circuit and a switching frequency of the switching element to a predetermined range to cause that a current flowing in switching of the switching element to at least the first winding or the second winding is equal to (Continued)

or less than a predetermined value and to cause the resonant inverter to perform soft switching.

6 Claims, 11 Drawing Sheets

(51) Int. Cl.
    *H02M 3/335*     (2006.01)
    *H02M 3/337*     (2006.01)
    *H02M 7/537*     (2006.01)
    *B60L 5/00*     (2006.01)
    *H02M 1/08*     (2006.01)
    *H02M 7/48*     (2007.01)

(52) U.S. Cl.
    CPC ...... *H02M 3/33569* (2013.01); *H02M 1/0009* (2021.05); *H02M 1/0058* (2021.05); *H02M 7/4815* (2021.05)

(56) References Cited

U.S. PATENT DOCUMENTS

| 2005/0099827 | A1* | 5/2005 | Sase | H02M 3/33569 363/16 |
| 2012/0039378 | A1* | 2/2012 | Nakayama | H03L 7/08 375/226 |
| 2016/0190946 | A1* | 6/2016 | Fu | H02M 3/33546 363/21.02 |
| 2016/0276955 | A1 | 9/2016 | Harada | H02M 7/537 |

FOREIGN PATENT DOCUMENTS

| JP | 2012-253968 A | 12/2012 |
| JP | WO2015/079518 A1 | 5/2015 |
| JP | 2015-139264 A | 7/2015 |
| WO | WO 2016/057395 A1 | 4/2016 |

* cited by examiner

POWER SUPPLY DEVICE FOR ELECTRIC VEHICLE

TECHNICAL FIELD

Embodiments of the present invention relate to a power supply for an electric vehicle. Priority is claimed to Japanese Patent Application No. 2017-212151, filed Nov. 1, 2017, the content of which is incorporated herein by reference.

BACKGROUND ART

There are power supplies for electric vehicles that include resonant inverters. Values of resonant frequencies of resonant circuits of the resonant inverters are determined mainly depending on capacitances of capacitors and inductances of transformers. When semiconductor switching elements cutting off currents flowing in the resonant circuits of the resonant inverters are caused to perform soft switching, actual resonant frequencies of the resonant circuits are set to be higher than frequencies for cutting off the semiconductor switching elements (switching frequencies) periodically. When the actual resonant frequencies of the resonant circuits are lower than the switching frequencies, the semiconductor switching elements cut off the currents in a state in which currents exceeding a predetermined value flow, and therefore operate through hard switching for switching an operation state while the currents flow. When power amounts supplied to loads from power supply for electric vehicles vary, values of the resonant frequencies vary. Therefore, an unintended increase in a power loss in the power supply for electric vehicles occurs in some cases.

CITATION LIST

Patent Literature

[Patent Literature 1]
Japanese Unexamined Patent Application, First Publication No. 2015-139264

SUMMARY OF INVENTION

Technical Problem

An objective of the present invention is to provide a power supply for an electric vehicle capable of inhibiting an increase in a power loss occurring due to a variation in a power amount supplied to a load.

Solution to Problem

According an embodiment of the present invention, a power supply for an electric vehicle includes a resonant inverter, a transformer, an influence inhibitor, and a control unit. The resonant inverter includes a first resonant capacitor included in a resonant circuit and a switching element that cuts off a current flowing in the resonant circuit, is supplied with direct-current power from a power supply, and generates first alternating-current power from the direct-current power through resonance of the resonant circuit and periodic switching of the switching element. The transformer includes at least a first winding and a second winding mutually electrically insulated and magnetically coupled, is included in a part of the resonant circuit, supplies first alternating-current power generated by the resonant inverter to the first winding, and supplies second alternating-current power after the conversion of the first alternating-current power from the second winding to a load. The control unit confines a difference between a resonant frequency of the resonant circuit and a switching frequency of the switching element to a predetermined range to cause that a current flowing in switching of the switching element to at least the first winding or the second winding is equal to or less than a predetermined value and to cause the resonant inverter to perform soft switching.

DESCRIPTION OF EMBODIMENTS

Hereinafter, a power supply for electric vehicle according to embodiments will be described with reference to the drawings. In the following description, the same reference signs are given to configurations that have identical or similar functions. Then, repeated description of these configurations will be omitted in some cases.

A power supply for electric vehicle 1 according an embodiment is an example of a power supply for electric vehicle. In the present specification, "soft switching" is a method of driving a switching element that switches between a conductive state and a cutoff state in a state in which a current flowing in a switching element at the time of switching is equal to or less than a predetermined minute value (a predetermined value) in a switching element used to convert power. In the "soft switching," for example, a current flowing in a switching element at the time of switching is about 0 A (amperes). By driving a switching element through soft switching, it is possible to inhibit occurrence of a loss in the switching element. On the other hand, a method of driving a switching element that performs switching in a state in which a current flowing in a switching element at the time of switching exceeds a predetermined value is referred to as "hard switching." In the present specification, "connection" includes electric connection.

First Embodiment

Figure 1A:
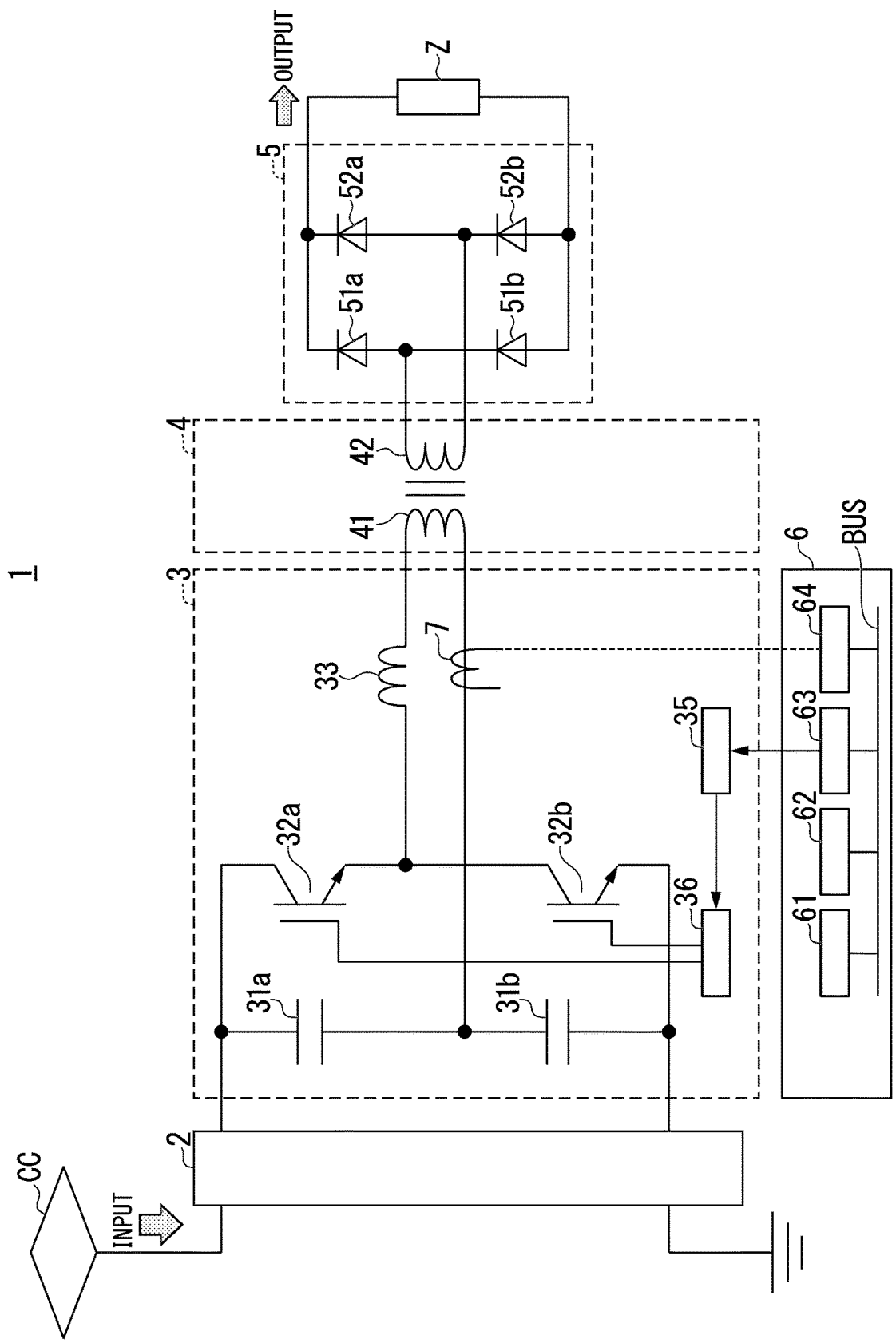
FIG. 1A is a diagram illustrating an overall configuration of a power supply for electric vehicle according to a first embodiment.

FIG. 1A is a diagram illustrating an overall configuration of a power supply for electric vehicle according to a first embodiment. The power supply 1 for electric vehicle is connected in series to a current path between a current collector CC supplied with power from an overhead wire (feeder) F (not illustrated) and a wheel W (not illustrated) grounded via a line R (not illustrated). A pole that has substantially the same potential as a pole on the side of the line R and the wheel W in FIG. 1A is indicated as a ground pole.

The power supply 1 for electric vehicle includes, for example, a power conversion circuit 2, a resonant inverter 3, a transformer 4, a rectifier 5 (rectifier circuit), a control unit 6, and a current detector 7 (a first current detector). Reference sign Z denotes a load.

The power conversion circuit 2 is connected to the rear stage of the current collector CC and converts power collected by the current collector CC into direct-current power with a predetermined voltage. The resonant inverter 3 to which a direct current is input is connected to the rear stage of the power conversion circuit 2. For example, the power conversion circuit 2 may convert an alternating-current power received by the current collector CC serving as an alternating-current direct-current power converter into direct-current power or may convert first direct-current power collected by the current collector CC serving as a direct-current voltage converter into second direct-current power. In the following description, a case in which the current collector CC receives the first direct-current power will be described as an example.

The resonant inverter 3 converts the second direct-current power which is an output of the power conversion circuit 2 into first alternating-current power and outputs the first alternating-current power. For example, a frequency of the first alternating-current power accords with a switching frequency of switching elements 32a and 32b to be described below. A pair of primary-side terminals of the transformer 4 are connected to a pair of output terminals of the resonant inverter 3.

The transformer 4 includes at least a primary winding 41 (a first winding) and a secondary winding 42 (a second winding) mutually electrically insulated and magnetically coupled. The transformer 4 is included in a resonant circuit and the first alternating-current power generated by the resonant inverter 3 is supplied to the primary-side terminal connected to the primary winding 41. The transformer 4 converts the first alternating-current power output from the resonant inverter 3 into second alternating-current power in accordance with a winding ratio between the primary winding 41 and the secondary winding 42 and supplies the secondary alternating-current power after the conversion from a secondary-side terminal connected to the secondary winding 42. The rectifier 5 is connected to the pair of secondary-side terminals of the transformer 4.

The rectifier 5 performs full wave rectification on the secondary alternating-current power output by the transformer 4. For example, the rectifier 5 includes diodes 51a and 52a that form an upper arm and diodes 51b and 52b that form a lower arm. The diodes 51a and 51b are connected in series and the diodes 52a and 52b are connected in series. A load Z is connected to the rear stage of the rectifier 5 and power rectified by the rectifier 5 is supplied to the load Z. A filter (not illustrated) that removes a high frequency component (noise) from the output of the rectifier 5 and outputs the component from which the high frequency component is removed to the load Z may be connected. Further, when a load is an alternating-current load, a power conversion circuit (not illustrated) may be connected between an output unit of the rectifier 5 and an input unit of a load.

The control unit 6 includes, for example, a storage unit 61, a central processing unit (CPU) 62, a driving unit 63, and a current value acquisition unit 64. The storage unit 61, the CPU 62, the driving unit 63, and the current value acquisition unit 64 are connected via a bus. The storage unit 61 includes a semiconductor memory. The CPU 62 includes a processor that executes a desired process in accordance with a software program. The driving unit 63 generates a control signal of the resonant inverter 3 under the control of the CPU 62. The current value acquisition unit 64 acquires a detection result of the current detector 7. For example, the CPU 62 of the control unit 6 causes the driving unit 63 to control the resonant inverter 3 based on a detection result of the current detector 7 acquired by the current value acquisition unit 64. Hereinafter, processes performed by the CPU 62, the driving unit 63, and the current value acquisition unit 64 will be simply described together as a process of the control unit 6 in some cases. In this case, instead of the above description, for example, the control unit 6 controls the resonant inverter 3 based on a detection result of the current detector 7 in the following description. The control unit 6 controls the entire power supply 1 for electric vehicle in addition to the above description.

Here, an example of the resonant inverter 3 according to the embodiment will be described. The resonant inverter 3 includes, for example, capacitors 31a and 31b, switching elements 32a and 32b, a resonant reactor 33, a control frequency adjustment unit 35, and a drive circuit 36.

The capacitors 31a and 31b are connected in series to form a filter capacitor. A pair of first ends of the capacitors 31a and 31b connected in series are connected to the first pole of an output terminal of the power conversion circuit 2 and second ends thereof are connected to a second pole of an output terminal of the power conversion circuit 2. For example, capacitances of the capacitors 31a and 31b may be the same and characteristics may be uniform.

The switching elements 32a and 32b are connected in series. The switching element 32a is connected to the first pole of the output terminal of the power conversion circuit 2 to form a so-called upper arm. The switching element 32b is connected to the second pole of the output terminal of the power conversion circuit 2 to form a so-called lower arm. The switching elements 32a and 32b are, for example, insulated gate bipolar transistors (IGBTs), injection enhanced gate transistors (IEGTs), or metal-oxide-semiconductor field-effect transistors (MOSFETs) which can be applied to self-excited control. For example, the switching elements 32a and 32b are switched between a conductive state and a cutoff state at a timing generated by the control frequency adjustment unit 35.

The control frequency adjustment unit 35 receives a control signal from the driving unit 63 of the control unit 6, adjusts a frequency of a control pulse supplied to the drive circuit 36, and supplies the control pulse with the adjusted frequency to the drive circuit 36. For example, the control frequency adjustment unit 35 includes a transmitter (not illustrated) and a divider capable of changing a division ratio. The control frequency adjustment unit 35 adjusts the division ratio under the control of the control unit 6 and generates a control pulse with a pre-decided frequency. The frequency is a frequency selected from a plurality of pre-decided frequency candidates. The control frequency adjustment unit 35 sets the above frequency as a switching frequency at which the switching elements 32a and 32b are controlled.

The drive circuit 36 supplies a gate signal corresponding to the control pulse supplied from the control frequency adjustment unit 35 to the switching elements 32a and 32b. The switching elements 32a and 32b switch between a conductive state and a cutoff state based on the gate signal supplied from the drive circuit 36.

As described above, the control frequency adjustment unit 35 can adjust a difference between the resonant frequency of the resonant circuit and the switching frequency of the switching elements 32a and 32b in accordance with the switching of the switching frequency. In the following description, the control frequency adjustment unit 35 is assumed to select a frequency $f_L$ with a relatively low frequency and a frequency $f_H$ higher than the frequency $f_L$ as the switching frequency. The control frequency adjustment unit 35 is an example of an influence inhibition unit.

The resonant reactor 33 is connected between a connection point of the switching elements 32a and 32b and the first end of the primary side terminal of the transformer 4. The second end of the primary side terminal of the transformer 4 is connected to the connection point (middle point) of the capacitors 31a and 31b. When necessary inductance of the transformer 4 is satisfied, the resonant reactor 33 may be omitted.

The control unit 6 causes the current detector 7 to detect a current flowing in the transformer 4. The current detector 7 illustrated in FIG. 1A detects a current flowing in the primary winding of the transformer 4. For example, when supply (output) of power from the transformer 4 is stopped, an influence of the stopping of the supply of the power has an influence on the primary side of the transformer 4 in some cases. The control unit 6 inhibits the influence by controlling gate voltages of the switching elements 32a and 32b in accordance with a detection current value of the current flowing in the primary winding of the transformer 4.

For example, the control unit 6 according to the embodiment adjusts the switching frequency of the resonant inverter 3 based on the detection current value of a current flowing in the primary winding of the transformer 4. The details thereof will be described below.

The resonant inverter 3 illustrated in FIG. 1A is an example of a half bridge type voltage inverter. The resonant inverter 3 is not limited to the resonant inverter illustrated in FIG. 1A and may be, for example, a full bridge type voltage inverter or current inverter.

Figure 1B:
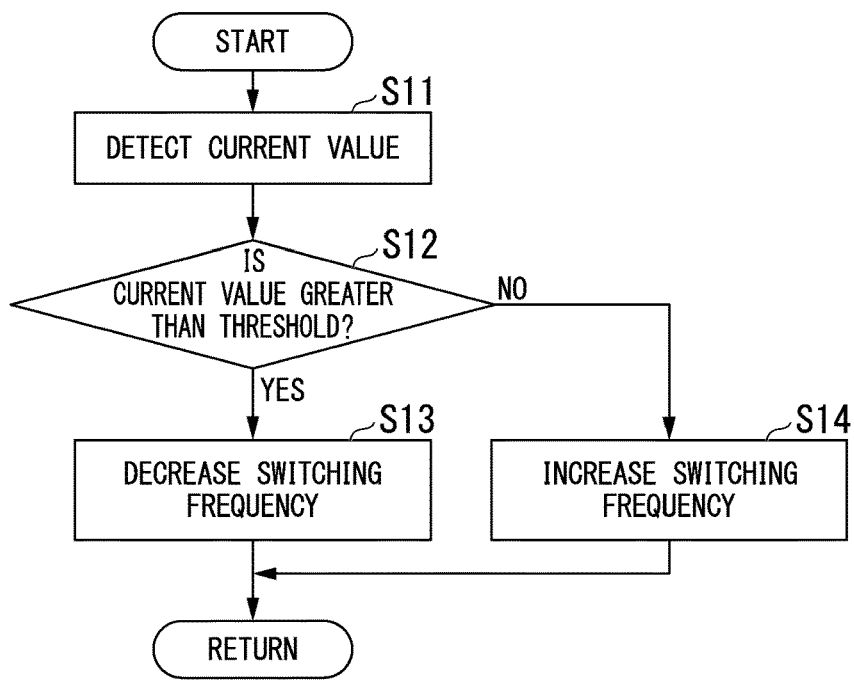
FIG. 1B is a flowchart illustrating a process of adjusting a switching frequency according to the first embodiment.

A process of adjusting the switching frequency according to the embodiment will be described with reference to FIGS. 1B to 1D. FIG. 1B is a flowchart illustrating a process of adjusting a switching frequency according to the embodiment.

The current detector 7 detects a current of the primary winding of the transformer 4. The CPU 62 of the control unit 6 causes the current value acquisition unit 64 to acquire current values detected by the current detector 7 and records the current values as time-series data in the storage unit 61 (step S11). The CPU 62 of the control unit 6 determines whether the acquired current value is greater than a threshold $I_{TH}$ (step S12). For example, the threshold $I_{TH}$ is determined using a rated current value or the like of the resonant inverter 3 as a standard. The value of the threshold $I_{TH}$ is set to a value equal to or less than the rated current of the resonant inverter 3 and greater than a variation width of a load current at normal times.

When the current value is greater than the value of the threshold $I_{TH}$, the control unit 6 adjusts the value of the switching frequency to a value lower than the value before the adjustment (step S13). For example, the control unit 6 sends a control signal for designating the frequency $f_L$ as the switching frequency to the control frequency adjustment unit 35 so that the switching frequency generated by the control frequency adjustment unit 35 is adjusted. A value of the switching frequency in this case may be a pre-decided value. A lower limit of the switching frequency may be set and the value of the switching frequency may be adjusted gradually in pre-decided steps until the switching frequency reaches the lower limit. Thus, the series of processes illustrated in the drawing ends.

When the current value is equal to or less than the threshold $I_{TH}$, the control unit 6 adjusts the value of the switching frequency so that the value is higher than a value before the adjustment (step S14). For example, the control unit 6 sends a control signal for designating the frequency $f_H$ as the switching frequency to the control frequency adjustment unit 35 so that the switching frequency generated by the control frequency adjustment unit 35 is adjusted. A value of the switching frequency in this case may be a pre-decided value within a frequency range in which switching of the switching elements 32a and 32b is soft switching. An upper limit of the switching frequency at which the switching of the switching elements 32a and 32b is the soft switching may be set and the control unit 6 may adjust the value of the switching frequency in a range in which the switching frequency reaches the upper limit. The control unit 6 may adjust the value of the switching frequency gradually in pre-decided steps so that the value of the switching frequency is close to the upper limit. A series of processes illustrated in the drawing ends.

Figure 1C:
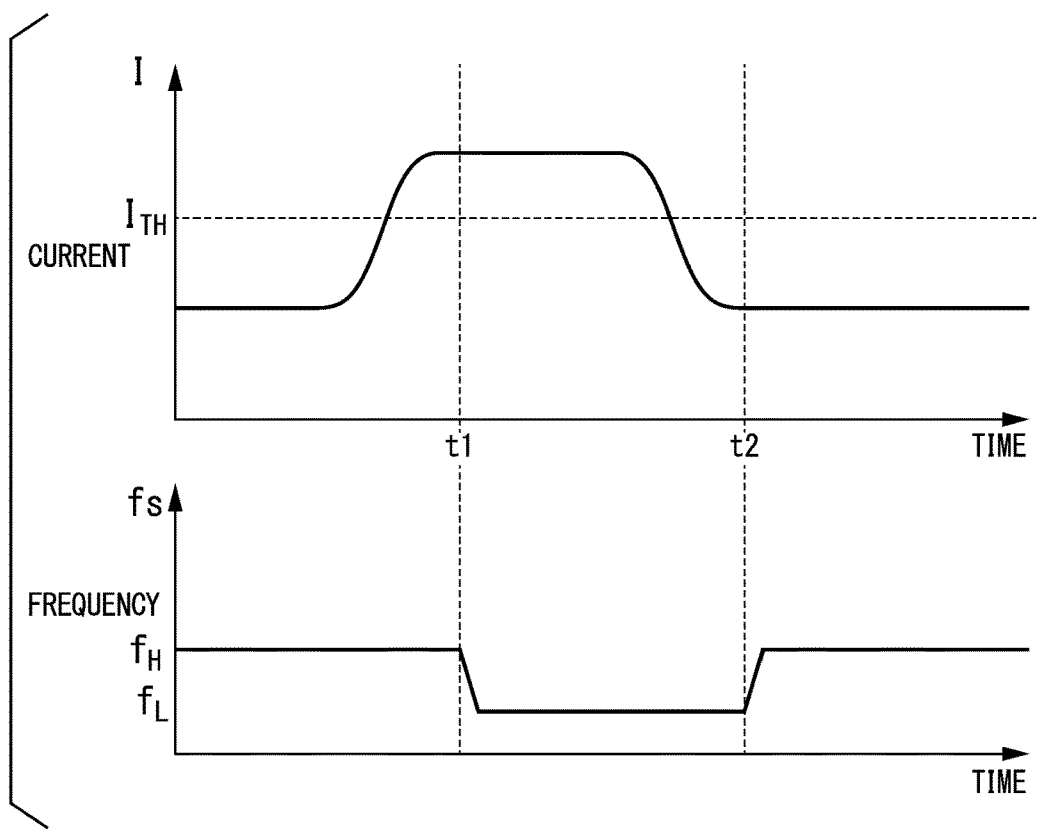
FIG. 1C is a diagram illustrating the process of adjusting the switching frequency according to the first embodiment.

FIG. 1C is a diagram illustrating the process of adjusting the switching frequency according to the embodiment. A timing chart is illustrated in FIG. 1C, where examples of changes in the switching frequency and a current value detected by the current detector 7 are depicted. $I_{TH}$ denotes a threshold used to determine the current value. For example, the control unit 6 can select one of the frequencies $f_H$ and $f_L$ as a switching frequency (fs).

In an initial stage illustrated in the drawing, switching of the switching elements 32a and 32b is soft switching in a state in which the current value detected by the current detector 7 is lower than the threshold $I_{TH}$. In this case, the control unit 6 selects the frequency $f_H$ as the switching frequency. The control unit 6 identifies the state of the resonant inverter 3 at a predetermined period. Time t1 and time t2 illustrated in the drawing are timings defined at the predetermined period. A time (predetermined period) from time t1 to time t2 is sufficiently longer than the switching period of the switching elements 32a and 32b (a period defined based on the frequencies $f_H$ and $f_L$).

It is assumed that the current value detected by the current detector 7 is higher than the threshold $I_{TH}$ until time t1. When time t1 comes, the control unit 6 identifies that the current value detected by the current detector 7 is greater than the threshold $I_{TH}$ and selects the frequency $f_L$ as the switching frequency. For example, based on a result indicating that the control unit 6 identifies that the current value at the time of switching of the resonant inverter 3 is greater than the threshold $I_{TH}$, the control unit 6 determines that the switching of the switching elements 32a and 32b is hard switching and automatically sets the value of the switching frequency of the resonant inverter 3 to the frequency $f_L$. Thus, the switching of the switching elements 32a and 32b transitions from the hard switching to the soft switching. The control unit 6 keeps the value of the switching frequency at the frequency $f_L$ until time t2 which is a subsequent detection time.

For example, it is assumed that the current value detected by the current detector 7 is less than the threshold $I_{TH}$ until time t2. When time t2 comes, the control unit 6 identifies that the current value detected by the current detector 7 is less than the threshold $I_{TH}$ and selects the frequency $f_H$ as the switching frequency.

The control unit 6 keeps the value of the switching frequency at the frequency $f_H$ until a subsequent detection time.

A frequency selected by the control unit 6 when the value of the switching frequency is lowered may be a pre-decided value, as described above, or may be a value calculated based on the current frequency and a difference value decided in advance so that the difference value is lowered by a predetermined amount from a current frequency.

Figure 1D:
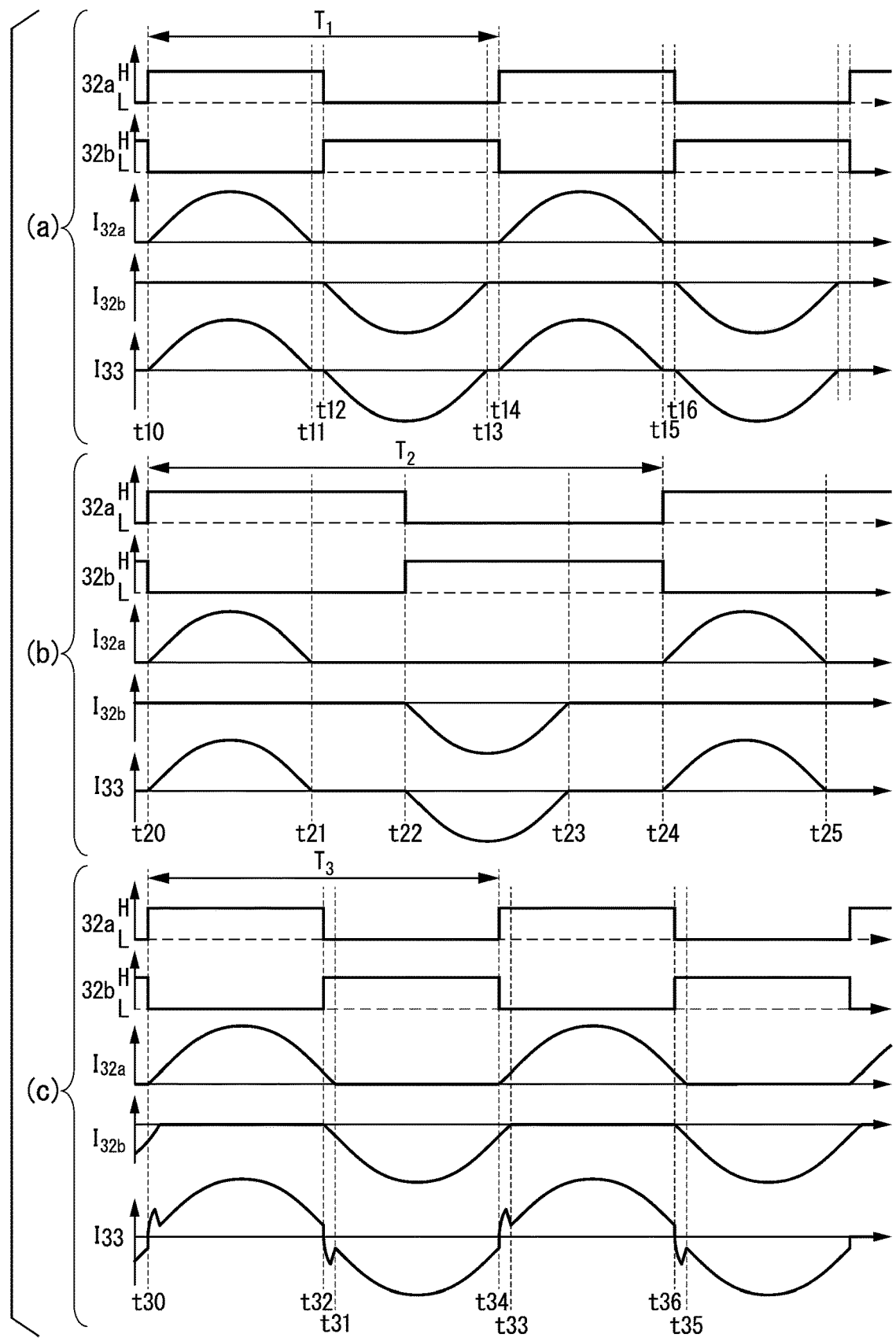
FIG. 1D is a diagram illustrating the process of adjusting the switching frequency according to the first embodiment.

FIG. 1D is a diagram illustrating the process of adjusting the switching frequency according to the embodiment. In (a) to (c) of FIG. 1D, three timing charts in which conditions are mutually different are depicted. For example, in the timing chart of (a) of FIG. 1D, an example of a situation in which the switching of the switching elements 32a and 32b is established as soft switching in a state in which the control unit 6 selects the frequency $f_H$ as the switching frequency is depicted. A control period in this case is T1.

At the uppermost stage and the second state of the timing chart in (a) of FIG. 1D, gate signals (32a and 32b) of the switching elements 32a and 32b are depicted, respectively. In the drawing, notation of a guard time between the gate signals is omitted. The switching elements 32a and 32b enter a conductive state when signal levels of the gate signals are at an H level and enter a cutoff state when the signal levels of the gate signals are at an L level. At third to fifth stages of the timing chart in (a) of FIG. 1D, illustrated waveforms of waveforms ($I_{32a}$ and $I_{32b}$) of currents flowing in the switching elements 32a and 32b and a waveform ($I_{33}$) of a current flowing in the resonant reactor 33 are depicted. The capacitors 31a and 31b are equally charged and respective terminal voltages are assumed to be substantially equal. The waveform ($I_{33}$) of the current flowing in the resonant reactor 33 is equivalent to the current ($I_{33}$) flowing in the primary winding of the transformer 4. The waveform ($I_{33}$) of the current flowing in the resonant reactor 33 is an example of a waveform of a load current.

From time t10 to time t12, the control unit 6 controls the switching elements 32a and 32b such that the switching element 32a enters the conductive state and the switching element 32b enters the cutoff state. During this period of time, the current $I_{32a}$ flows for a period of time from the conductive state of the switching element 32a to a half of a resonant period of the resonant circuit. However, when this period of time has passed, the switching element 32a enters a reverse bias and the flow of a current stops (time t11). Time t11 to time t12 is a period of time in which no current flows. Since the switching element 32b is in the cutoff state from time t10 to time t12, the waveform of the current $I_{33}$ shown at the fifth stage has the same form as the waveform of the current $I_{32a}$.

From time t12 to time t14, the control unit 6 controls the switching elements 32a and 32b such that the switching element 32b enters the conductive state and the switching element 32b enters the cutoff state. The waveform of each signal from time t12 to time t14 is generated so that polarity is different from that of a current waveform from time t10 to time t12 and the waveform is similar to the waveform of each signal from time t10 to time t12 described above. The current $I_{32b}$ is detected as a signal that has negative polarity by the current detector 7.

As described above, the current $I_{32a}$ and the current $I_{32b}$ are substantially 0 at a time point of time t11 at which the switching element 32a enters the cutoff state and time t13 at which the switching element 32b enters the cutoff state. In a period of time from time t14 to time t15, the switching element 32a controlled in the conductive state causes the current $I_{32a}$ to flow. After time t16, repetition is performed similarly. The waveform depicted in (a) of FIG. 1D is a waveform in a case in which the switching of the switching elements 32a and 32b is established as soft switching.

In the timing chart of (b) of FIG. 1D, an example related to a state in which the control unit 6 selects the frequency $f_L$ as the switching frequency is depicted. In this case, as in the case of (a) of FIG. 1D, an example of a situation in which the switching of the switching elements 32a and 32b is established as the soft switching is also depicted. Times t20, t21, t22, t23, t24, and t25 indicate times that pass in the described sequence and correspond to the above-described times t10, 01, t12, t13, t14, and t15. A control period in the case illustrated in (b) of FIG. 1D is T2 longer than T1. When a resonant condition of a resonant circuit is the same as the resonant condition in the case of (a) of FIG. 1D, the length of a period of time in which a current flows is the same as the length in the case of (a) of FIG. 1D and the length of a period of time in which no current flows is longer than the length in the case of (a) of FIG. 1D.

On the other hand, in the timing chart of (c) of FIG. 1D, an example of a situation in which a resonant condition of a resonant circuit is different from the resonant condition in the case of (a) of FIG. 1D and a period of time in which a current flows is longer than the period of time in the case of (a) of FIG. 1D is depicted. The case of (c) of FIG. 1D exemplifies a state in which the control unit 6 selects the frequency $f_H$ as a switching frequency as in the case of (a) of FIG. 1D. Here, for the waveform illustrated in the drawing, an example of a situation in which the switching of the switching elements 32a and 32b is not established as the soft switching is depicted. Times t30, t32, t34, and t36 indicate times that pass in the described sequence and correspond to the above-described times t10, t12, t13, t14, and t16. Times t31, t33, and t35 indicate times later than times t32, t34, and t36. A control period in the case illustrated in (c) of FIG. 1D is T3 equal to T1.

From time t30 to time t32, the control unit 6 controls the switching elements 32a and 32b such that the switching element 32a enters the conductive state and the switching element 32b enters the cutoff state similarly to the case of (a) of FIG. 1D. For the waveform of the current $I_{32a}$ in (c) of FIG. 1D, a time point of time t32 is focused on. In the case of this instance, even when the switching element 32a transitions to the cutoff state at time t32, the resonant reactor 33 causes a current to flow in the same direction as that of the current $I_{32a}$ by an action of the resonant circuit from time t32 to time t31. Due to the electromotive force, potentials on the side of the switching elements 32a and 32b of the resonant reactor 33 increase.

On the other hand, from time t32 to time t34, the switching element 32b enters the conductive state, but an excessive current flows in the switching element 32b due to the electromotive force in some cases. For example, a current from time t32 to time t31 is greater than a current value of a waveform generated by the original resonant circuit in a state in which there is no electromotive force in some cases. Since the same event also subsequently occurs, an instantaneous value (an absolute value), an effective value, and an average value of the current $I_{33}$ are together greater than in the case in which the soft switching is established. Depending on a condition, a peak value is also greater than in the case in which the soft switching is established in some cases.

An example of the foregoing waveform is illustrated, but when there is a resonant circuit in the state illustrated in (c) of FIG. 1D, the control unit 6 can realize a state in which the soft switching is established by extending the control period to T2, as illustrated in (b) of FIG. 1D.

According to the embodiment, a range in which the value of the load current flowing from the power supply 1 for electric vehicle to the load Z varies includes a predetermined range related to an increase in a conversion loss of power without an intention when desired measures to inhibit an influence of the variation in the value of the load current are not taken. When an individual difference of characteristics of the capacitor, the resonant reactor, and the transformer used in the power supply 1 for electric vehicle exceeds a desired range, the value of an actual resonant frequency deviates from a designed value and a conversion loss in the resonant inverter 3 increases in some cases. The control unit 6 of the power supply 1 for electric vehicle according to the embodiment confines a difference between the switching frequency and the resonant frequency of the resonant circuit to a predetermined range so that a current flowing in the switching elements 32a and 32b is equal to or less than a predetermined value when the switching elements 32a and 32b of the resonant inverter 3 are switched and causes the switching elements 32a and 32b of the resonant inverter 3 to perform the soft switching. Thus, a state in which the switching of the switching elements 32a and 32b is the soft switching is kept by adjusting the switching frequency so that the switching elements 32a and 32b are switched. Thus, the resonant inverter 3 can reduce a switching loss of the switching elements 32a and 32b. When the value of the resonant frequency of the resonant inverter 3 deviates from the designed value and the value of the resonant frequency and the value of the switching frequency at which the switching elements 32a and 32b are switched do not satisfy the condition that the resonant inverter is configured, the switching of the switching elements 32a and 32b becomes the hard switching. By applying the resonant inverter 3 on this condition in accordance with the foregoing method, it is possible to bring about a state in which the switching elements 32a and 32b are caused to perform the soft switching, and thus it is possible to reduce the switching loss of the switching elements 32a and 32b.

The control unit 6 can optimize the value of the switching frequency, and thus it is possible to achieve simplicity of a cooling system of the resonant inverter 3 and realize miniaturization and weight reduction. The optimization process for the value of the switching frequency by the control unit 6 may be performed by the control frequency adjustment unit 35. A threshold for determining a current value flowing in the transformer 4 may be determined in advance within a range of a current value at which the hard switching is not performed in the switching elements 32a and 32b.

In this way, the control unit 6 has a function of varying the value of the switching frequency of the resonant inverter 3, and thus the switching of the switching elements 32a and 32b can transition to the soft switching by changing the value of the switching frequency of the switching elements 32a and 32b even when the switching of the switching elements 32a and 32b is the hard switching without matching between the value of the resonant frequency of the resonant inverter 3 and the value of the switching frequency at which the switching elements 32a and 32b are switched.

The load Z according to the embodiment may include a power storage unit electrically connected in parallel to the load Z. In this case, when a potential of the power storage unit becomes higher than a potential output by the rectifier 5 in the charging, supply of power from the rectifier 5 to the load Z is stopped. In this way, in addition to a case in which the load Z is cut off by a mechanical switch or the like, the supply of the power from the rectifier 5 to the load Z is stopped in some cases. According to the embodiment, even when the load Z includes a power storage unit in a configuration, as described above, it is possible to inhibit an influence of the stopping of the supply of the power.

(First Modified Example of First Embodiment)

The resonant inverter 3 according to the first embodiment adjusts the switching frequency of the resonant inverter to a pre-decided switching frequency in a fixed or semi-fixed manner. Instead of this, in a first modified example, an instance in which a switching frequency of a resonant inverter is adjusted to an optimized frequency will be described.

In the case of the resonant inverter, by forming a current waveform as a waveform closer to a sinusoidal wave, it is possible to further improve efficiency. Accordingly, the control unit 6 finds an upper limit of the resonant frequency at which the switching of the switching elements 32a and 32b is the soft switching, forms a waveform of a current flowing to the primary side of the transformer 4 as a waveform closer to a sinusoidal wave, and outputs the waveform.

For example, the power supply 1 for electric vehicle includes the current detector 7 that detects a current flowing in the primary winding 41 of the transformer 4. The control unit 6 finds a switching frequency at which switching of the resonant inverter 3 is the soft switching from a range of the switching frequency allowed for control in which the switching elements 32a and 32b are caused to switch periodically based on a current value detected by the current detector 7. Further, the control unit 6 selects a higher switching frequency.

According to the foregoing first modified example, in addition to the same advantageous effects as those of the first embodiment, it is possible to optimize the switching frequency and cause a waveform of an output voltage to come close to a sinusoidal wave by causing the control unit 6 to find a switching frequency higher than the frequency at which the switching of the switching elements 32a and 32b of the resonant inverter is the soft switching. For example, in a case in which a period of time obtained by adding a dead timing for inhibiting the hard switching to a semi-period corresponding to the resonant frequency of the resonant circuit matches a semi-period of the switching frequency, a feasible highest frequency is achieved.

(Second Modified Example of First Embodiment)

The resonant inverter 3 according to an embodiment is an example of a half bridge type voltage inverter. The resonant inverter 3 is not limited to the resonant inverter illustrated in FIG. 1A. Instead of this, for example, a full bridge type voltage inverter or current inverter may be used. In the case of the current inverter, the control unit 6 can measure a voltage instead of measuring a current, as described above, and can perform the control similarly based on the voltage.

Second Embodiment

Figure 2:
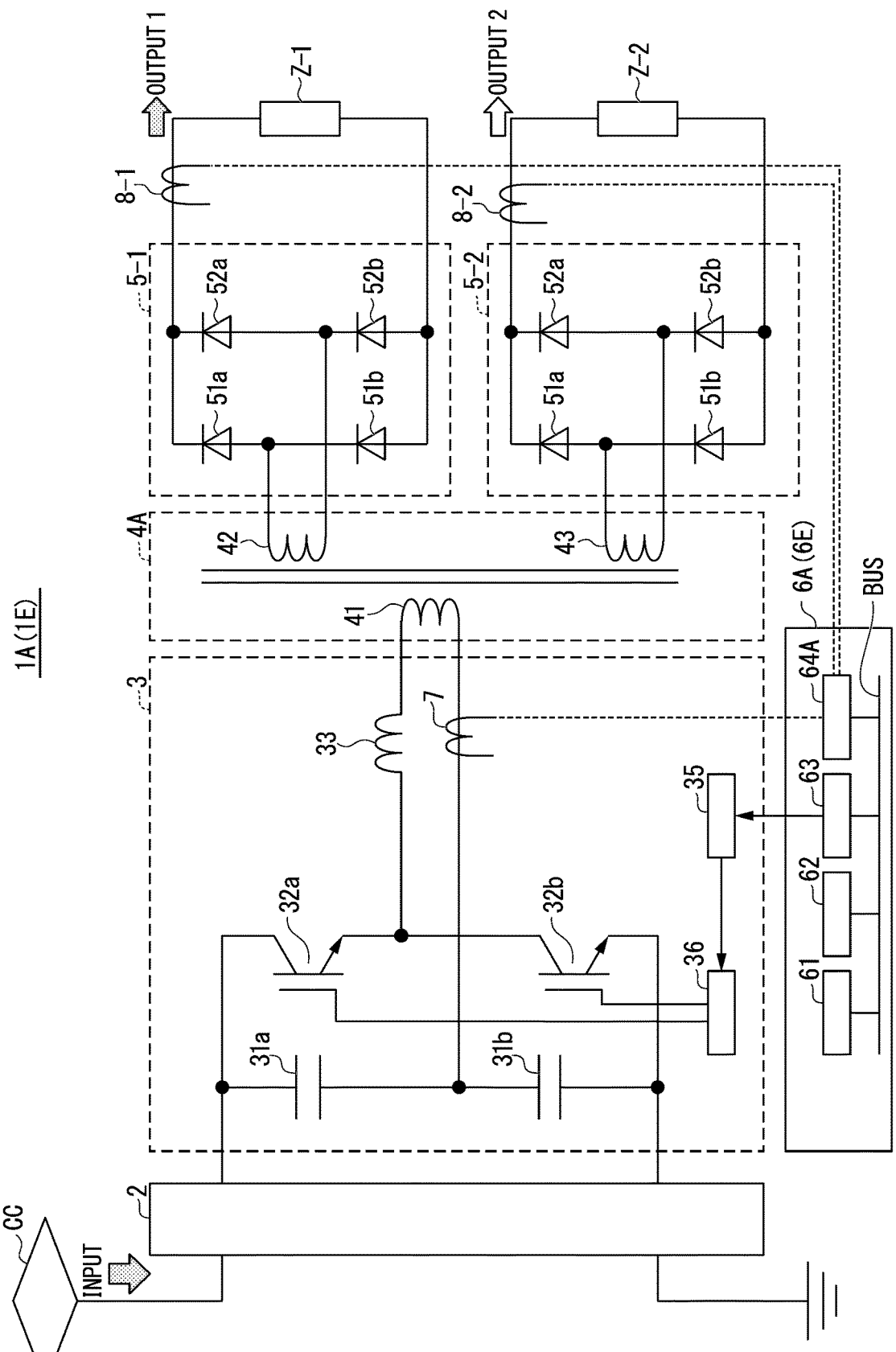
FIG. 2 is a diagram illustrating an overall configuration of a power supply for electric vehicle according to a second embodiment.

A second embodiment will be described in detail with reference to the drawings. FIG. 2 is a diagram illustrating an overall configuration of a power supply for electric vehicle according to the second embodiment. The embodiment is different from the first embodiment illustrated in FIG. 1A, as described above, in that there are a plurality of output systems of the transformer 4. Hereinafter, this point will be described mainly in detail.

A power supply for electric vehicle 1A includes, for example, the power conversion circuit 2, the resonant inverter 3, a transformer 4A, a rectifier 5-1 (a rectification circuit), a rectifier 5-2 (a rectification circuit), a control unit 6A, the current detector 7, a current detector 8-1 (a second current detector), and a current detector 8-2 (a third current detector).

The transformer 4A includes at least the primary winding 41, a secondary winding 42 (a second winding), and a third winding 43 (a third winding) mutually electrically insulated and magnetically coupled. The transformer 4A converts an alternating-current voltage output from the resonant inverter 3 in accordance with a winding ratio between the first winding 41 and the second winding 42 and supplies second alternating-current power after the conversion from a secondary-side terminal connected to the secondary winding 42. The rectifier 5-1 is connected to a second-side terminal of the transformer 4A.

The transformer 4A converts the alternating-current power output from the resonant inverter 3 in accordance with a winding ratio between the first winding 41 and the third winding 43 and supplies third alternating-current power after the conversion from a third-side terminal connected to the third winding 43. The rectifier 5-2 is connected to the third-side terminal of the transformer 4A.

The rectifier 5-1 and the rectifier 5-2 perform full wave rectification on the alternating-current power output by the transformer 4A as in the above-described rectifier 5.

The current detector 8-1 and a load Z-1 are provided on the rear stage of the rectifier 5-1 illustrated in FIG. 2. The load Z-1 is supplied with the second alternating-current power (output 1). The current detector 8-1 detects a load current (a second load current) flowing from the rectifier 5-1 to the load Z-1. Similarly, the current detector 8-2 and a load Z-2 are provided on the rear stage of the rectifier 5-2. The load Z-2 is supplied with the third alternating-current power (output 2). The current detector 8-2 detects a load current (a third load current) flowing from the rectifier 5-2 to the load Z-2.

A filter (not illustrated) that removes a high frequency component (noise) from the output of the rectifier 5-1 and outputs the component from which the high frequency component is removed to the load Z-1 may be connected to the rear stage of the rectifier 5-1. Further, a filter (not illustrated) that removes a high frequency component (noise) from the output of the rectifier 5-2 and outputs the component from which the high frequency component is removed to the load Z-2 may be connected to the rear stage of the rectifier 5-2.

The control unit 6A corresponds to the above-described control unit 6. The control unit 6A includes a current value acquisition unit 64A instead of the current value acquisition unit 64 of the above-described control unit 6. The current value acquisition unit 64A corresponds to the above-described current value acquisition unit 64. The current value acquisition unit 64A acquires detection results of the current detector 7, the current detector 8-1, and the current detector 8-2. For example, the CPU 62 of the control unit 6 causes the driving unit 63 to control the resonant inverter 3 based on the detection results of the current detector 7, the current detector 8-1, and the current detector 8-2 acquired by the current value acquisition unit 64. For example, the control unit 6A calculates a load current based on the detection results of the current detector 7, the current detector 8-1, and the current detector 8-2. When at least the load current exceeds a predetermined value, the control unit 6A sets a relatively low switching frequency.

A process of adjusting a switching frequency according to the embodiment will be described with reference to FIG. 1B described above.

In the embodiment, three current detectors, the current detectors 7, 8-1, and 8-2, are included. The current detectors 7, 8-1, and 8-2 each detect a current flowing in the winding of the transformer 4A at each position. The control unit 6A acquires current values detected by the foregoing three current detectors and records the current values as time-series data in the storage unit 61 (step S11).

For example, the control unit 6A determines whether one of the acquired current values is greater than the threshold (step S12).

When the current value is greater than the threshold, the control unit 6A adjusts the switching frequency to a relatively low switching frequency (step S13) and the series of processes illustrated in the drawing ends.

When all the current values are each equal to or less than the threshold, the control unit 6A adjusts the switching frequency to a relatively high switching frequency (step S14) and the series of processes illustrated in the drawing ends.

By repeating the foregoing processes, the control unit 6A can apply a scheme according to the embodiment even when the transformer 4A has a plurality of secondary-side systems. The scheme can be applied not only in the case of the secondary winding and the third winding illustrated in FIG. 2 but also in a case in which more windings such as a fourth winding are included. The scheme according to the first embodiment may be applied to the adjustment of the current value.

When the loads Z-1 and Z-2 are connected to the plurality of secondary-side systems of the transformer 4A as in the embodiment, for example, supply of power is stopped in some cases due to occurrence of a variation in power consumption of the loads Z-1 and Z-2 of any system. In primary-side change of combined inductance of the transformer 4A, when there is a system in which the foregoing supply of the power is stopped, the inductance of the winding of the system is apparently invalidated. As a result, the combined inductance in the primary-side change of the transformer 4A is greater than in a state in which the output of the system is valid. At this time, since the resonant frequency of the resonant circuit is lowered, there is a possibility of the resonant inverter 3 transitioning from the soft switching to the hard switching. For example, by causing the control unit 6A to determine that a current of any system is less than a given value using the current detectors 8-1 and 8-2 included in each system and changing the switching frequency of the resonant inverter through the foregoing process, it is possible to inhibit the hard switching.

According to the embodiment, in addition to the same advantageous effects as those of the first embodiment, the control unit 6A of the power supply 1A for electric vehicle adjusts at least one of the resonant frequency of the resonant circuit and the switching frequency so that a difference between the resonant frequency of the resonant circuit and the switching frequency falls within a predetermined range when any load current detected by each current detector is equal to or less than a predetermined value in the switching. Thus, even when the output of any system is stopped and the hard switching is performed without matching between the resonant frequency of the resonant inverter and the switching frequency, the power supply 1A for electric vehicle can keep the soft switching by adjusting the switching frequency and inhibits an increase in a switching loss as in the first embodiment.

The control unit 6A adjusts at least one of the value of the resonant frequency of the resonant circuit and the value of the switching frequency so that the values of the second load current and the third load current flowing through the switching of the switching elements 32a and 32b are equal to or less than a predetermined value, and thus it is possible to keep the soft switching of the switching elements 32a and 32b.

Third Embodiment

Figure 3A:
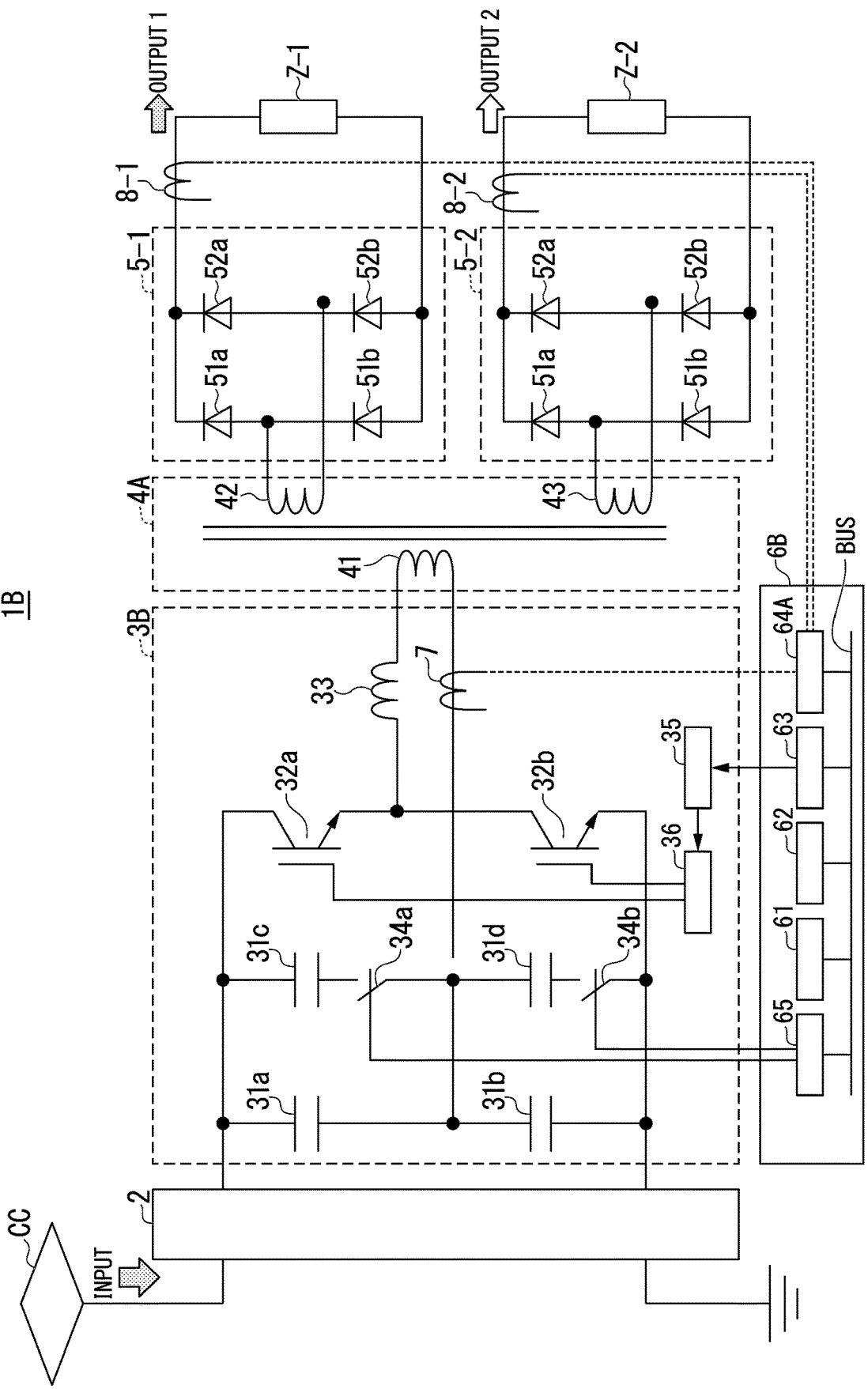
FIG. 3A is a diagram illustrating an overall configuration of a power supply for electric vehicle according to a third embodiment.

A third embodiment will be described in detail with reference to the drawings. FIG. 3A is a diagram illustrating an overall configuration of a power supply for electric vehicle according to the third embodiment. The embodiment is different from the second embodiment illustrated in FIG. 2, as described above, in a configuration of capacitors. Hereinafter, this point will be described mainly in detail.

A power supply for electric vehicle 1B includes, for example, the power conversion circuit 2, a resonant inverter 3B, the transformer 4A, the rectifier 5-1, the rectifier 5-2, a control unit 6B, the current detector 7, the current detector 8-1, and the current detector 8-2.

The resonant inverter 3B includes, for example, capacitors 31a, 31b, 31c, and 31d, switching elements 32a and 32b, the resonant reactor 33, and contactors 34a and 34b (a first contactor).

The capacitors 31a and 31b (a first resonant capacitor) are mutually connected in series. A first end of the pair of capacitors 31a and 31b connected in series is connected to a first pole of the output terminal of the power conversion circuit 2 and a second end thereof is connected to a second pole of the output terminal of the power conversion circuit 2.

The capacitors 31c and 31d (a second resonant capacitor) are mutually connected in series. A first end of the pair of capacitors 31c and 31b connected in series is connected to the first pole of the output terminal of the power conversion circuit 2 and a second end thereof is connected to the second pole of the output terminal of the power conversion circuit 2. A connection point (a middle point) of the capacitors 31c and 31d is connected to a connection point (a middle point) of the capacitors 31a and 31b and the second end of the primary-side terminal of the transformer 4A. The pair of capacitors 31c and 31d is combined with the pair of capacitors 31a and 31b to form a filter capacitor. In the following description, the capacitors 31a, 31b, 31c, and 31d are collectively referred to as the capacitors 31 in some cases.

Further, in the pair of capacitors 31c and 31d connected in series, the contactor 34a associated with the capacitor 31c and the contactor 34b associated with the capacitor 31d are provided. The contactor 34a is connected in series to the capacitor 31c and is disposed between the middle point and the first pole of the output terminal of the power conversion circuit 2. The contactor 34b is connected in series to the capacitor 31d and is disposed between the middle point and the second pole of the output terminal of the power conversion circuit 2. The contactors 34a and 34b may be able to open or close a circuit such as a semiconductor switching element.

When the contactors 34a and 34b are closed, the capacitors 31c and 31d are electrically connected in parallel to the capacitors 31a and 31b and the capacitance of the capacitor 31 increases compared to the case of the pair of capacitors 31a and 31b. By connecting the capacitor 31c in parallel to the capacitor 31a and connecting the capacitor 31d in parallel to the capacitor 31b, it is possible to lower the value of the resonant frequency by the increase in the capacitance of the capacitor 31. For example, by reducing the capacitance of the capacitors 31c and 31d with respect to the capacitance of the capacitors 31a and 31b, it is possible to use the capacitors 31c and 31d to minutely adjust the resonant frequency. Alternatively, the capacitance of each capacitor 31 may be the same.

The control unit 6B corresponds to the above-described control units 6 and 6A. The control unit 6B includes, for example, the storage unit 61, the CPU 62, the driving unit 63, the current value acquisition unit 64A, and a switch driving unit 65. The storage unit 61, the CPU 62, the driving unit 63, the current value acquisition unit 64A, and the switch driving unit 65 are connected via a bus. The switch driving unit 65 sends a control signal to the contactors 34a and 34b to switch an open state and a closed state of a contact point of the contactors 34a and 34b. For example, processes performed by the CPU 62, the driving unit 63, the current value acquisition unit 64, and the switch driving unit 65 will be simply described collectively as a process of the control unit 6B in some cases. When at least the load current is greater than a predetermined value, the control unit 6B opens the contactors 34a and 34b to release the parallel connection of the capacitors 31c and 31d.

Figure 3B:
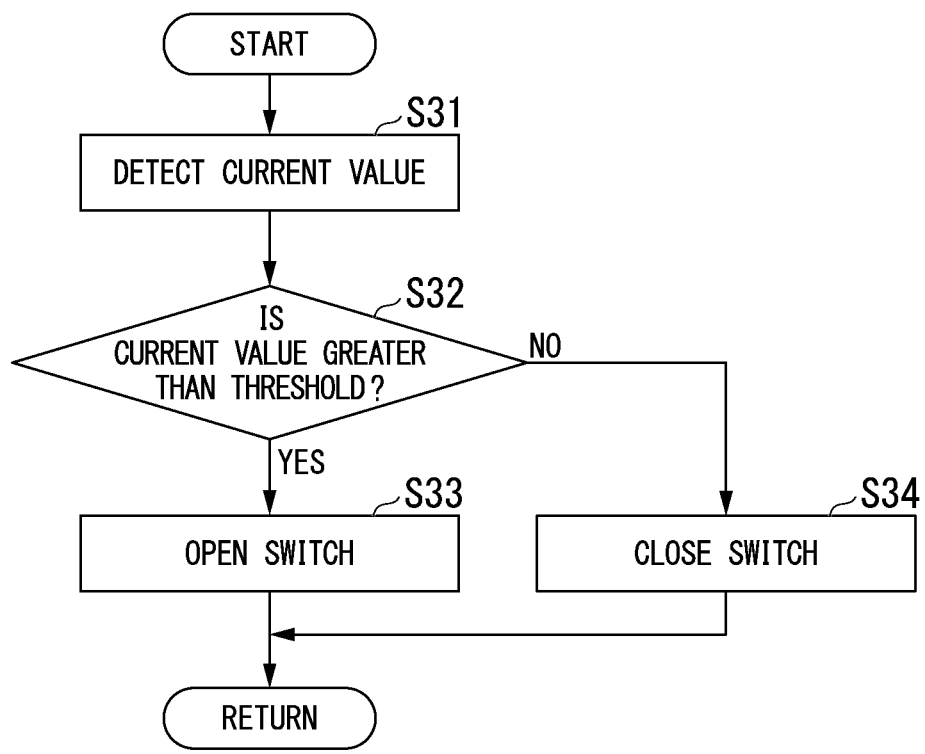
FIG. 3B is a flowchart illustrating a process of adjusting a switching frequency according to the third embodiment.

A process of adjusting a switching frequency according to the embodiment will be described with reference to FIG. 3B. FIG. 3B is a flowchart illustrating the process of adjusting the switching frequency according to the embodiment.

The control unit 6B acquires current values detected by the current detector 7 and records the current values as time-series data in the storage unit 61 (step S31). The control unit 6B determines whether the acquired current value is greater than a threshold (step S32).

When the current value is greater than the threshold, the control unit 6B opens the contactors 34a and 34b (switches) (step S33) and ends the series of processes illustrated in the drawing.

When the current value is equal to or less than the threshold, the control unit 6B closes the contactors 34a and 34b (switches) (step S34) and ends the series of processes illustrated in the drawing.

For example, by repeating the foregoing processes, the control unit 6B can inhibit the hard switching by changing the resonant frequency of the resonant inverter.

As described above, when the current value in the switching of the resonant inverter 3B is greater than a given value, the control unit 6B determines that the switching is the hard switching and automatically lowers the switching frequency of the resonant inverter. Thus, the switching transitions from the hard switching to the soft switching.

In the embodiment, the following control is also possible. Even in the embodiment, as in the second embodiment, there is a possibility of the resonant inverter 3B transitioning from the soft switching to the hard switching.

Figure 3C:
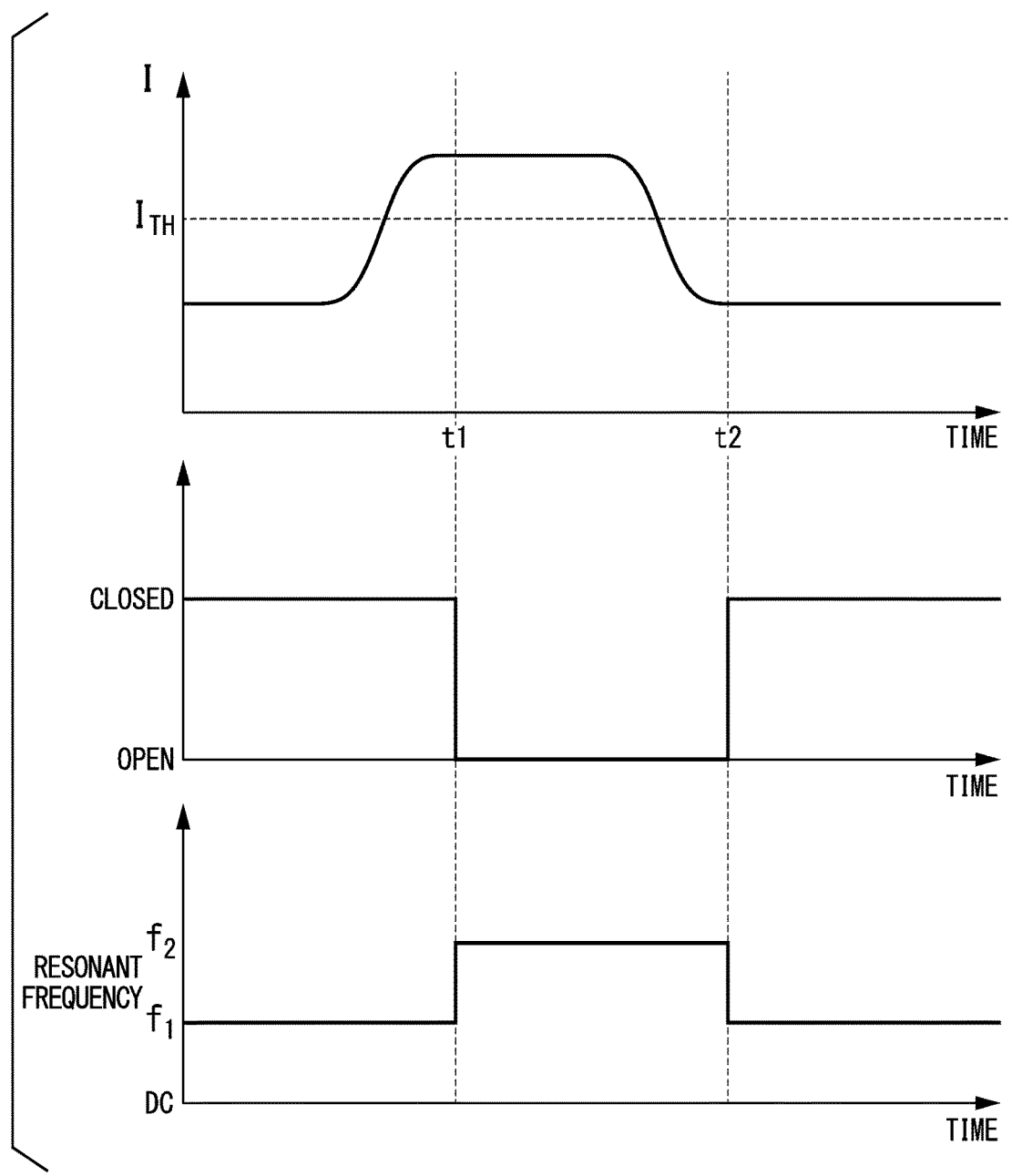
FIG. 3C is a diagram illustrating the process of adjusting the switching frequency according to the third embodiment.

FIG. 3C is a diagram illustrating the process of adjusting the switching frequency according to the embodiment. The timing chart illustrated in FIG. 3C, in the timing chart, a current value detected by the current detector 7, a state of a closer, and an example of a change in the resonant frequency of the resonant circuit are depicted.

At the initial state illustrated in the drawing, the switching of the switching elements 32a and 32b is the soft switching in a state in which the current value detected by the current detector 7 is less than the threshold $I_{TH}$. In this case, the control unit 6B selects a frequency $f_1$ as the resonant frequency. The control unit 6 identifies the state of the resonant inverter 3 at a predetermined period. A time t1 and a time t2 illustrated in the drawing are timings regulated at the predetermined period. A time (a predetermined period) from time t1 to time t2 is sufficiently longer than a switching period (a period regulated based on a resonant frequency $f_1$ and a resonant frequency $f_2$) of the switching elements 32a and 32b. The resonant frequency $f_1$ is assumed to be lower than the resonant frequency $f_2$.

It is assumed that the current value detected by the current detector 7 transitions to a state higher than the threshold $I_{TH}$ until time t1. When time t1 comes, the control unit 6 identifies the transition of the current value detected by the current detector 7 to the state higher than the threshold $I_{TH}$. The control unit 6 selects the resonant frequency $f_1$ as a switching frequency. For example, the control unit 6B identifies that the current value of any system is greater than the threshold $I_{TH}$ by using the current detectors 7, 8-1, and 8-2 included in each system. When the current value is greater than pre-decided threshold $I_{TH}$, the control unit 6B determines that the switching of the switching elements 32a and 32b is the hard switching and controls the contactors 34a and 34b to an open state based on a determination result. The control unit 6B raises the resonant frequency of the resonant circuit of the resonant inverter by automatically setting the value of the switching frequency of the resonant inverter 3 to the frequency $f_1$, and thus it is possible to inhibit the state of the hard switching from being kept (time t2). The process after time t2 refers to the above description.

According to the embodiment, the contactors 34a and 34b that release the parallel connection to the capacitors 31a and 31b (a first parallel resonant capacitor) of the capacitors 31c and 31d (a second parallel resonant capacitor) of the resonant inverter 3 are included. The control unit 6B controls the contactors 34a and 34b when the load current is greater than a predetermined value. Thus, in addition to the same advantageous effects as those of the first embodiment, it is possible to adjust the resonant frequency of the resonant circuit by changing the capacitance of the capacitor 31 even under the condition that the supply of the power of any power system of the secondary-side system of the transformer 4A is stopped, the matching between the resonant frequency of the resonant inverter 3B and the switching frequency is collapsed, and the switching becomes the hard switching. Thus, it is possible to keep the soft switching and inhibit an increase in a switching loss.

The disposition of the contactors 34a and 34b is not limited to the foregoing instance. For example, the contactors 34a and 34b or the like releasing the parallel connection may be provided in one or both of the capacitors 31a and 31b and the capacitors 31c and 31d of the resonant inverter 3. Here, when the contactors are provided in both of the capacitors, the control unit 6B performs control such that at least one of the pair of capacitors 31a and 31b and the pair of capacitors 31c and 31d is connected to the primary side of the transformer 4A. Thus, for example, by setting the capacitance of the pair of capacitors 31a and 31b and the capacitance of the pair of capacitors 31c and 31d to different values, it is possible to set the number of switching stages of the resonant frequency to at least three stages.

Fourth Embodiment

Figure 4A:
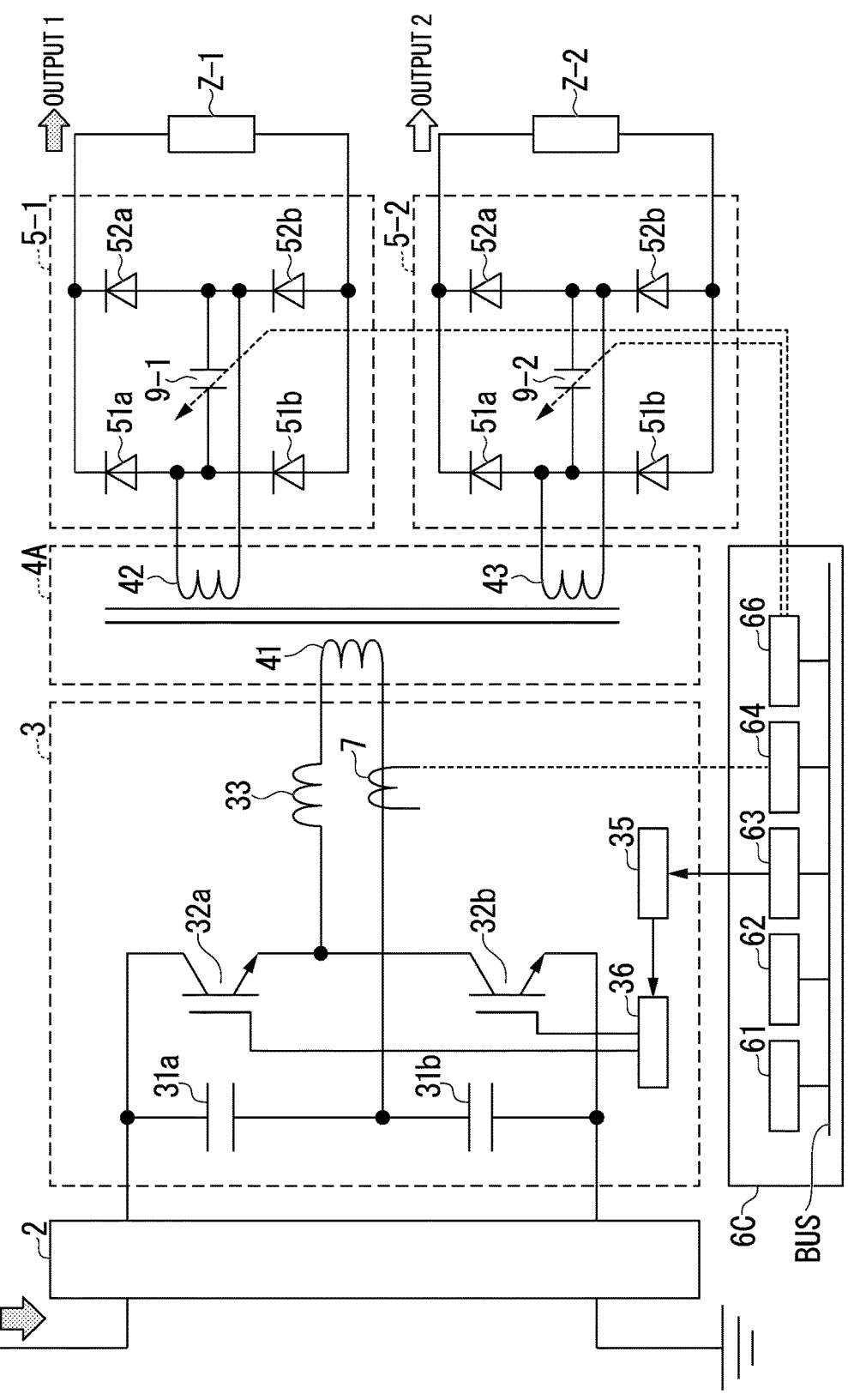
FIG. 4A is a diagram illustrating an overall configuration of a power supply for electric vehicle according to a fourth embodiment.

A fourth embodiment will be described in detail with reference to the drawings. FIG. 4A is a diagram illustrating an overall configuration of a power supply for electric vehicle according to the fourth embodiment. The embodiment is different from the second embodiment illustrated in FIG. 2 in that capacitors are included in an output side of the transformer 4A. Hereinafter, this point will be described mainly in detail.

A power supply for electric vehicle 1C includes, for example, the power conversion circuit 2, the resonant inverter 3, the transformer 4A, the rectifier 5-1, the rectifier 5-2, a control unit 6C, the current detector 7, a capacitor 9-1 (a parallel capacitor), and a capacitor 9-2 (a parallel capacitor).

The capacitor 9-1 is connected in parallel to the second winding 42 of the transformer 4A. The capacitor 9-1 is a parallel circuit of the second winding 42 of the transformer 4. The capacitor 9-2 is connected in parallel to the third winding 43 of the transformer 4A. The capacitor 9-2 is a parallel circuit of the third winding 42 of the transformer 4.

As described above, in the power supply 1C for electric vehicle, the capacitors 9-1 and 9-2 are added to an output side of the transformer 4A, compared to the second embodiment. The capacitors 9-1 and 9-2 are an example of an influence inhibitor.

The control unit 6C corresponds to the above-described control unit 6. The control unit 6C includes, for example, the storage unit 61, the CPU 62, the driving unit 63, the current value acquisition unit 64, and a switch driving unit 66. The storage unit 61, the CPU 62, the driving unit 63, the current value acquisition unit 64, and the switch driving unit 66 are connected via a bus. For example, processes performed by the CPU 62, the driving unit 63, the current value acquisition unit 64, and the switch driving unit 66 will be simply described collectively as a process of the control unit 6B in some cases. The switch driving unit 66 will be described later. The control unit 6C according to the embodiment may not be required to include a function of adjusting a switching frequency of the resonant inverter 3.

As described above, the capacitors 9-1 and 9-2 are provided on the output side of the transformer 4A. Thus, when supply of power of any system among a plurality of secondary-side systems of the transformer 4A is stopped, an alternating current flows to the capacitors 9-1 and 9-2 provided in the system and inductance of the winding of the transformer 4A is thus validated. Therefore, a resonant frequency of the resonant inverter 3 is not changed.

According to the embodiment, a load Z-1 is connected to the secondary winding 42 of the transformer 4A via the rectifier 5-1 and a load Z-2 is connected to the third winding 43 via the rectifier 5-2. The power supply 1C for electric vehicle further includes the capacitor 9-1 which is a parallel circuit connected in parallel to the secondary winding 42 of the transformer 4A and the capacitor 9-2 which is a parallel circuit connected in parallel to the third winding 43. Thus, even when supply of power to the load of any system is stopped, an alternating current flows to the capacitors 9-1 and 9-2 provided in the system, the soft switching is thus kept, and it is possible to inhibit an increase of a switching loss occurring due to a variation in power consumed by the load of each system of the transformer 4A. In the foregoing configuration, it can be unnecessary to detect output stop by the control unit 6C.

It is enough for the capacitors 9-1 and 9-2 to be provided only in the system in which a stop state of power supply occurs.

(Modified Example of Fourth Embodiment)

The capacitors 9-1 and 9-2 according to the embodiment are connected and fixed to the secondary side of the transformer 4A. On the other hand, the capacitors 9-1 and 9-2 according to a modified example are appropriately connected to the secondary side of the transformer 4A.

Figure 4B:
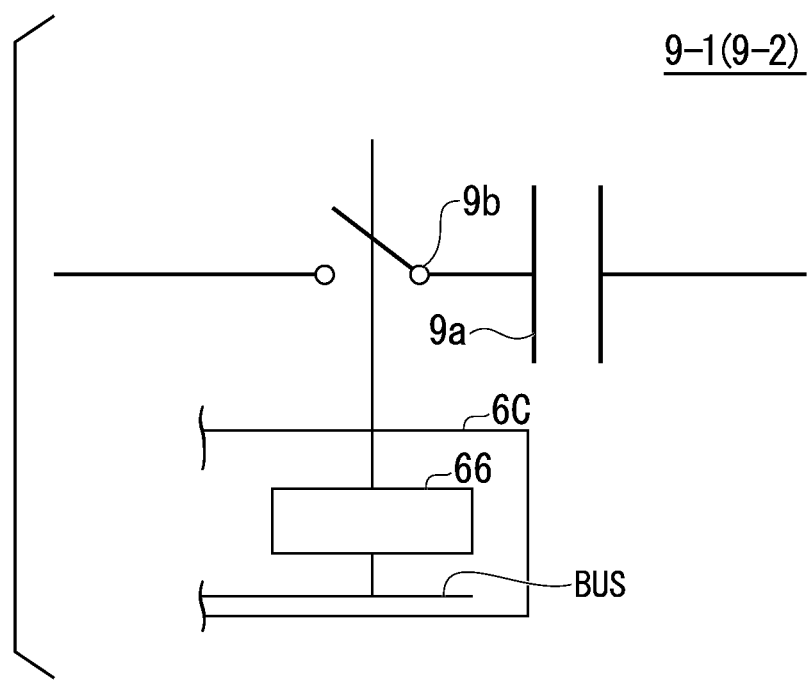
FIG. 4B is a diagram illustrating a configuration of a capacitor according to a modified example of the fourth embodiment.

FIG. 4B is a diagram illustrating a configuration of a capacitor according to the modified example of the fourth embodiment. The capacitor 9-1 illustrated in FIG. 4B includes, for example, a capacitor body 9a and a contactor 9b connected in series to the capacitor body 9a. For example, the contactor 9b may open or close a circuit such as a semiconductor switching element.

The switch driving unit 66 of the control unit 6C according to the modified example sends a control signal to the contactor 9b provided in each of the capacitors 9-1 and 9-2 to switch an open state and a closed state of a contact point of the contactor 9b. For example, when a current value detected by the current detector 7 is greater than a pre-decided value (the threshold $I_{TH}$) as in FIG. 3B described above, the control unit 6C opens the contactor 9b. When the current value detected by the current detector 7 is equal to or less than the pre-decided value (the threshold $I_{TH}$), the control unit 6C closes the contactor 9b.

In this way, the control unit 6C identifies that the hard switching occurs and performs control such that the resonant frequency is lowered when a current value is greater than the threshold based on the current value detected by the current detector 7.

According to the foregoing modified example, in addition to the same advantageous effects as those of the fourth embodiment, it is not necessary to connect the capacitor 9-1 and the like to the transformer 4A normally and the control unit 6C makes connection when it is detected that the hard switching occurs. Since the capacitor 9-1 and the like becomes a load of the transformer 4A, a loss in the capacitor 9-1 or the like occurs in the connection. According to the modified example, it is not necessary connect the capacitor 9-1 or the like to the transformer 4A normally and it is possible to reduce a switching loss compared to the case of the normal connection. The capacitors 9-1 and 9-2 and the switch driving unit 66 of the control unit 6C are examples of the influence inhibitor.

Fifth Embodiment

Figure 5A:
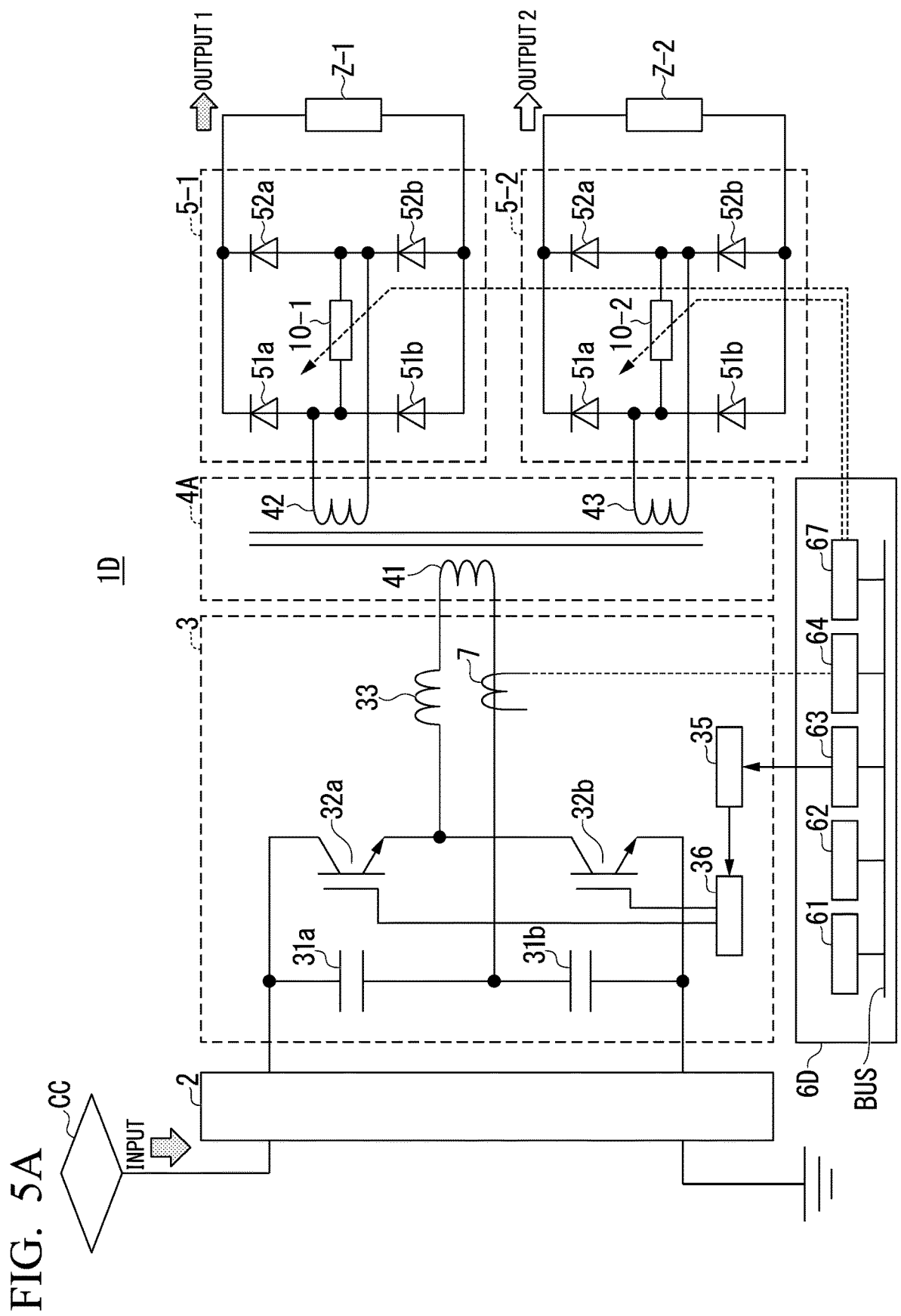
FIG. 5A is a diagram illustrating an overall configuration of a power supply for electric vehicle according to a fifth embodiment.

A fifth embodiment will be described in detail with reference to the drawings. FIG. 5A is a diagram illustrating an overall configuration of a power supply for electric vehicle according to the fifth embodiment. The embodiment is different from the fourth embodiment in that a resistor 10-1 and the like are included in place of the capacitor 9-1 and the like of the fourth embodiment. Hereinafter, this point will be described mainly in detail.

A power supply for electric vehicle 1D includes, for example, the power conversion circuit 2, the resonant inverter 3, the transformer 4A, the rectifier 5-1, the rectifier 5-2, a control unit 6D, the current detector 7, a resistor 10-1 (a parallel resistor), and a resistor 10-2 (a parallel resistor).

The resistors 10-1 and 10-2 are electric resistors.

While the capacitors 9-1 and 9-2 are provided on the secondary side of the transformer 4A in the fourth embodiment, the power supply 1D for electric vehicle according to the embodiment includes the resistors 10-1 and 10-2 in place of these capacitors compared to the fourth embodiment. The other points are the same as those of the fourth embodiment.

Compared to the second embodiment, in the power supply 1D for electric vehicle according to the embodiment, the resistors 10-1 and 10-2 are added to the output side of the transformer 4A. The resistors 10-1 and 10-2 are examples of an influence inhibitor.

The control unit 6D corresponds to the above-described control unit 6C. The control unit 6D includes a switch driving unit 67 instead of the switch driving unit 66 of the control unit 6C described above. The switch driving unit 67 corresponds to the switch driving unit 66 described above. The switch driving unit 67 will be described below. The control unit 6D according to the embodiment is not required to have a function of adjusting a switching frequency of the resonant inverter 3.

As described above, the resistors 10-1 and 10-2 are provided on the output side of the transformer 4A. Thus, even when supply of power of any system among a plurality of secondary-side systems of the transformer 4A is stopped, an alternating current flows to the resistors 10-1 and 10-2 provided in the system and inductance of the winding of the transformer 4A is thus validated. Therefore, a resonant frequency of the resonant inverter 3 is not changed.

According to the embodiment, a load is connected to the secondary winding 42 of the transformer 4A via the rectifier 5-1 and the rectifier 5-1 and a load is connected to the third winding 43 via the rectifier 5-2 and the rectifier 5-2. The power supply 1D for electric vehicle further includes the resistor 10-1 which is a parallel circuit connected in parallel to the secondary winding 42 of the transformer 4A and the resistor 10-2 which is a parallel circuit connected in parallel to the third winding 43. Thus, even when supply of power to the load of any system is stopped, the soft switching is thus kept, and it is possible to inhibit an increase of a switching loss occurring due to a variation in power consumed by the load of each system of the transformer 4A. In the foregoing configuration, it can be unnecessary to detect output stop by the control unit 6D.

It is enough for the resistors 10-1 and 10-2 to be provided only in the system in which a stop state of power supply occurs.

(Modified Example of Fifth Embodiment)

The resistors 10-1 and 10-2 according to the embodiment are connected and fixed to the secondary side of the transformer 4A. On the other hand, the resistors 10-1 and 10-2 according to a modified example are appropriately connected to the secondary side of the transformer 4A.

Figure 5B:
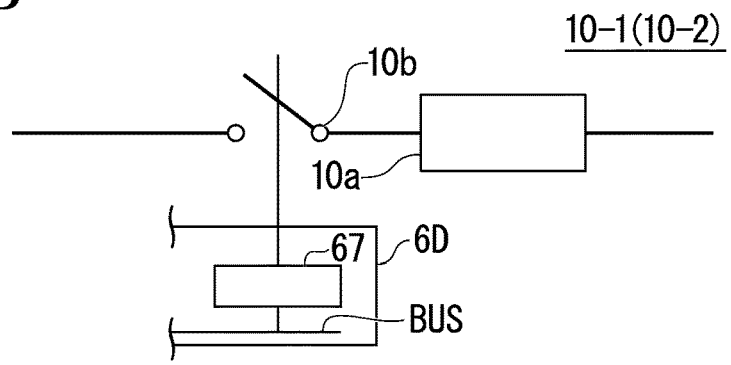
FIG. 5B is a diagram illustrating a resistor according to a modified example of the fifth embodiment.

FIG. 5B is a diagram illustrating the resistor according to a modified example of the fourth embodiment. The resistor 10-1 illustrated in FIG. 5B includes a resistor body 10a and a contactor 10b connected in series to the resistor body 10a. For example, the contactor 10b may open or close a circuit such as a semiconductor switching element.

The switch driving unit 67 of the control unit 6D according to the modified example sends a control signal to the contactor 10b provided in each of the resistors 10-1 and 10-2 to switch an open state and a closed state of a contact point of the contactor 10b. For example, when a current value detected by the current detector 7 is greater than a pre-decided value (the threshold), the control unit 6D according to the modified example opens the contactor 10b. When the current value detected by the current detector 7 is equal to or less than the pre-decided value (the threshold), the control unit 6D closes the contactor 10b.

In this way, the control unit 6D identifies that the hard switching occurs and performs control such that the resonant frequency is lowered when a current value is greater than the threshold based on the current value detected by the current detector 7.

According to the foregoing modified example, in addition to the same advantageous effects as those of the fifth embodiment, it is not necessary to connect the resistor 10-1 and the like to the transformer 4A normally and the control unit 6D makes connection when it is detected that the hard switching occurs. Since the resistor 10-1 and the like becomes a load of the transformer 4A, a loss in the resistor 10-1 or the like occurs in the connection. According to the modified example, it is not necessary connect the resistor 10-1 or the like to the transformer 4A normally and it is possible to reduce a switching loss compared to the case of the normal connection. The resistors 10-1 and 10-2 and the switch driving unit 67 of the control unit 6C are examples of the influence inhibitor.

Sixth Embodiment

Figure 6A:
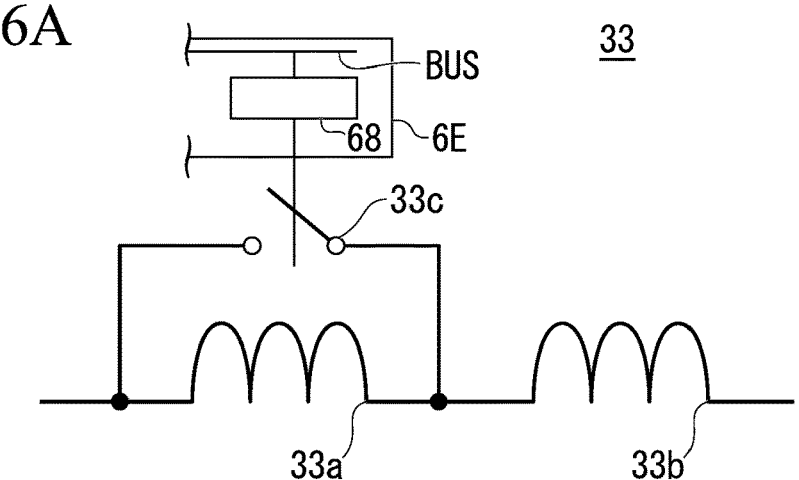
FIG. 6A is a diagram illustrating a reactor according to a sixth embodiment.

A sixth embodiment will be described in detail with reference to the drawings. FIG. 6A is a diagram illustrating a reactor according to the sixth embodiment. The embodiment is different from the second embodiment illustrated in FIG. 2 described above in a configuration of the reactor. Hereinafter, this point will be described mainly in detail.

A power supply for electric vehicle 1E according to the embodiment includes, for example, the power conversion circuit 2, the resonant inverter 3, the transformer 4A, the rectifier 5-1, the rectifier 5-2, a control unit 6E, the current detector 7, the current detector 8-1, and the current detector 8-2.

The resonant inverter 3 includes, for example, the capacitors 31a and 31b, the switching elements 32a and 32b, and the resonant reactor 33.

As illustrated in FIG. 6A, the resonant reactor 33 according to the embodiment includes, for example, a reactor 33a, a reactor 33b, and a contactor 33c (a second contactor).

The reactors 33-1 and 33-2 are electrically connected in series and are combined to function as the resonant reactor 33.

The contactor 33c is provided so that the contactor 33c short-circuits the reactor 33a in a closed state.

The control unit 6E corresponds to the above-described control unit 6C. The control unit 6E includes a switch driving unit 68 instead of the switch driving unit 66 of the control unit 6C described above. The switch driving unit 68 corresponds to the described-above switch driving unit 66. The control unit 6C according to the embodiment may not be required to include a function of adjusting a switching frequency of the resonant inverter 3.

The switch driving unit 68 of the control unit 6E sends a control signal to the contactor 33c provided in the reactor 33a to switch an open state and a closed state of a contact point of the contactor 3c. The control unit 6E opens the contactor 33c to release the short-circuiting of the reactor 33a when a load current flowing through the switching of at least the switching elements 32a and 32b is equal to or less than a predetermined value at the time of switching of the switching elements 32a and 32b. When at least the foregoing load current is greater than a predetermined value, the control unit 6 closes the contactor 33c to short-circuit the reactor 33a. For example, when at least the load current is greater than the predetermined value in the switching, the control unit 6E may close the contactor 33c to short-circuit the reactor 33a. In this case, the control unit 6 can exclude a period of time in which at least the load current is not switched from conditions of the control of the contactor 33c.

Figure 6B:
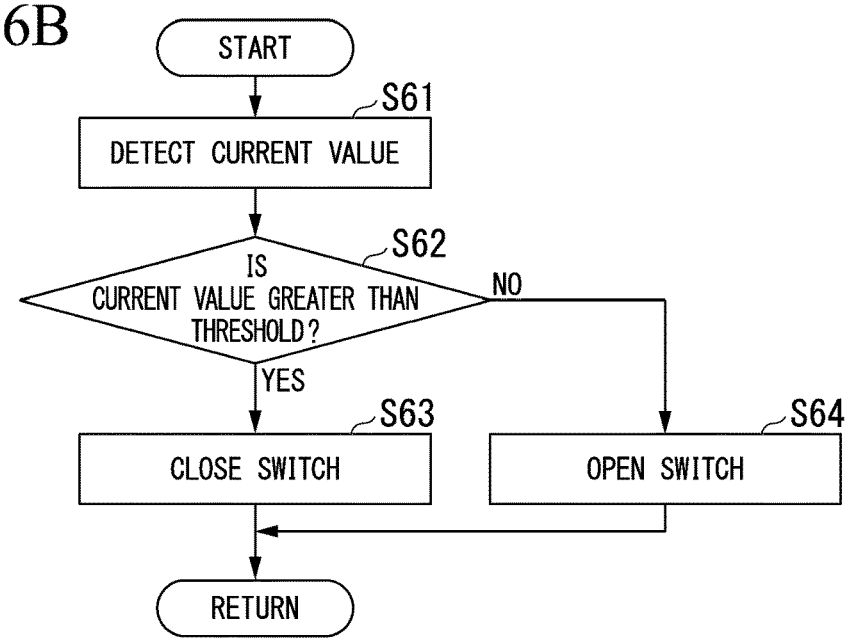
FIG. 6B is a flowchart illustrating a process of adjusting a switching frequency according to the sixth embodiment.

A process of adjusting a switching frequency according to the embodiment will be described with reference to FIG. 6B. FIG. 6B is a flowchart illustrating the process of adjusting the switching frequency according to the embodiment.

The control unit 6E acquires current values detected by the current detector 7 and records the current values as time-series data in the storage unit 61 (step S61). The control unit 6E determines whether the current value acquired in the switching of the load current is greater than a threshold (step S62).

When the current value is greater than the threshold, the control unit 6E closes the contactor 33c (a switch) (step S63) and ends the series of processes illustrated in the drawing.

When the current value is equal to or less than the threshold, the control unit 6E opens the contactor 33c (a switch) (step S64) and ends the series of processes illustrated in the drawing.

For example, by repeating the foregoing processes, the control unit 6E can inhibit the hard switching by changing the resonant frequency of the resonant inverter.

By repeating the foregoing processes, the control unit 6 determines that the switching is the hard switching and automatically raises the resonant frequency of the resonant circuit when the current value in the switching of the resonant inverter 3 is greater than a given value. Thus, the switching transitions from the hard switching to the soft switching.

According to the embodiment, in addition to the same advantageous effects as those of the first embodiment, the hard switching can be inhibited by opening the contactor 33c and releasing the short-circuiting of at least a part of the resonant reactor 33 when a current of at least the loads Z-1 and Z-2 is equal to or less than a predetermined value in switching. The reactor 33a, the contactor 33c, and the switch driving unit 68 of the control unit 6E are examples of the influence inhibitor.

The control units 6 to 6E according to the foregoing embodiments may be at least partially realized by a software functional unit or may be all realized by a hardware functional unit such as an LSI.

The power supply for electric vehicle according to at last one of the above-described embodiments includes: a resonant inverter including a first resonant capacitor included in a resonant circuit and a switching element that cuts off a current flowing in the resonant circuit, configured to be supplied with direct-current power from a power supply, and configured to generate first alternating-current power from the direct-current power through resonance of the resonant circuit and periodic switching of the switching element; a transformer including at least a first winding and a second winding mutually electrically insulated and magnetically coupled, included in a part of the resonant circuit, configured to supply first alternating-current power generated by the resonant inverter to the first winding, and configured to supply second alternating-current power after the conversion of the first alternating-current power from the second winding to a load; and an influence inhibitor configured to confine a difference between a resonant frequency of the resonant circuit and a switching frequency of the switching element to a predetermined range so that a current flowing in switching of the switching element to at least the first winding or the second winding is equal to or less than a predetermined value and causes the resonant inverter to perform soft switching. It is possible to inhibit an increase in a loss occurring due to a variation in power supplied to the load.

All the above-described embodiments have been proposed as examples and do not limit the scope of the present invention. Therefore, the embodiments can be realized in other various forms and various omissions, substitutions, and changes can be made within the scope of the present invention without departing from the gist of the present invention. The embodiments and the modifications are included in the equivalent scope as the invention described in the claims.

For example, an influence inhibitor that adjusts a difference between the resonant frequency of the resonant circuit and the switching frequency of the switching elements 32a and 32b may be provided. For example, the control frequency adjustment unit 35, the capacitors 9-1 and 9-2, the resistors 10-1 and 10-2, the reactor 33a, the contactor 33c, and the like are examples of the influence inhibitor. The influence inhibitor may be controlled by the control unit 6 such that a difference between the resonant frequency of the resonant circuit and the switching frequency of the switching elements 32a and 32b is confined to a predetermined range in which the current flowing in at least the first winding or the second winding is equal to or less than a predetermined value through the switching of the switching elements 32a and 32b, and the switching elements 32a and 32b are caused to perform the soft switching.

The influence inhibitor such as the control frequency adjustment unit 35 may be a part of the control unit 6 or the like.

REFERENCE SIGNS LIST 1, 1A, 1B, 1C, 1D Power supply for electric vehicle
2 Power conversion circuit
3, 3B Resonant inverter
31a, 31b, 31c, 31d Capacitor
32a, 32b Switching element
33 Resonant reactor
34a, 34b Contactor (first contactor)
35 Control frequency adjustment unit
36 Drive circuit
4, 4A Transformer
5, 5-1, 5-2 Rectifier (rectification circuit)
6, 6A, 6B, 6C, 6D Control unit
7 Current detector (first current detector)
8-1, 8-2 Current detector
9-1, 9-2 Capacitor (parallel capacitor)
10-1, 10-2 Resistor (parallel resistor)
CC Current collector

What is claimed is:

1. A power supply for an electric vehicle comprising:
a resonant inverter including a first resonant capacitor included in a resonant circuit and a switching element that cuts off a current flowing in the resonant circuit, the resonant inverter being configured to be supplied with a direct-current power from a power supply, and the resonant inverter being configured to generate a first alternating-current power from the direct-current power through resonance of the resonant circuit and periodic switching of the switching element;
a transformer including at least a primary winding and secondary windings including a first winding and a second winding, the primary winding, the first winding, and the second winding being electrically insulated from each other and magnetically coupled to each other, the transformer being included in part of the resonant circuit, the transformer being configured to supply the first alternating-current power generated by the resonant inverter to the primary winding, and the transformer being configured to supply, from the secondary windings to loads, a second alternating-current power after converting the first alternating-current power;
a control unit configured to confine a difference between a resonant frequency of the resonant circuit and a switching frequency of the switching element to a predetermined range, to cause a current flowing through the switching element to at least the first winding or the second winding to be equal to or less than a predetermined value, and to cause the resonant inverter to perform soft switching;
a first current detector configured to detect a first load current flowing in the first winding of the transformer;
a second current detector configured to detect a second load current flowing in the second winding of the transformer; and
wherein the control unit adjusts at least one of the resonant frequency of the resonant circuit and the switching frequency so that a difference between the resonant frequency of the resonant circuit and the switching frequency falls in the predetermined range and the switching of the resonant inverter is the soft switching when one of the second load current and the first load current is equal to or less than the predetermined value.

2. The power supply for the electric vehicle according to claim 1, further comprising:
a second resonant capacitor electrically connected in parallel to the first resonant capacitor of the resonant inverter; and
a first contactor configured to release the parallel connection between the first resonant capacitor and the second resonant capacitor,
wherein the control unit controls the first contactor such that the switching of the resonant inverter is the soft switching when one of the second load current and the first load current is equal to or less than the predetermined value.

3. The power supply for the electric vehicle according to claim claim 2, further comprising:
a second contactor configured to release the parallel connection,
wherein the control unit closes the first contactor and connects the parallel connection in parallel when a current flowing in at least the second winding is equal to or less than the predetermined value.

4. The power supply for the electric vehicle according to claim 3, further comprising:
a reactor electrically connected in series to an output of the resonant inverter and the first winding of the transformer; and
a third contactor configured to short-circuit the reactor,
wherein the control unit opens the third contactor and releases the short-circuiting of the reactor when a current flowing in at least the first winding is equal to or less than the predetermined value in the switching.

5. A power supply for an electric vehicle comprising:
a resonant inverter including a first resonant capacitor included in a resonant circuit and a switching element that cuts off a current flowing in the resonant circuit, the resonant inverter being configured to be supplied with a direct-current power from a power supply, and the resonant inverter being configured to generate a first alternating-current power from the direct-current power through resonance of the resonant circuit and periodic switching of the switching element;
a transformer including at least a first winding and a second winding electrically insulated from each other and magnetically coupled to each other, the transformer being included in part of the resonant circuit, the transformer being configured to supply the first alternating-current power generated by the resonant inverter to the first winding, and the transformer being configured to supply, from the second winding to a load, a second alternating-current power after converting the first alternating-current power, and
a control unit configured to confine a difference between a resonant frequency of the resonant circuit and a switching frequency of the switching element to a predetermined range, to cause a current flowing through the switching element to at least the first winding or the second winding to be equal to or less than a predetermined value, and to cause the resonant inverter to perform soft switching,
wherein a rectification circuit is connected to the second winding of the transformer and the load is connected to the second winding via the rectification circuit, and
wherein the power supply for the electric vehicle further comprises a parallel circuit connected in parallel to the second winding of the transformer.

6. The power supply for the electric vehicle according to claim 5, wherein the parallel circuit includes one of a parallel capacitor and a parallel resistor serving as the parallel circuit of the second winding of the transformer.

* * * * *